(No Model.)
W. H. KRETSINGER.
METHOD OF MAKING RAKES.
No. 328,690. Patented Oct. 20, 1885.
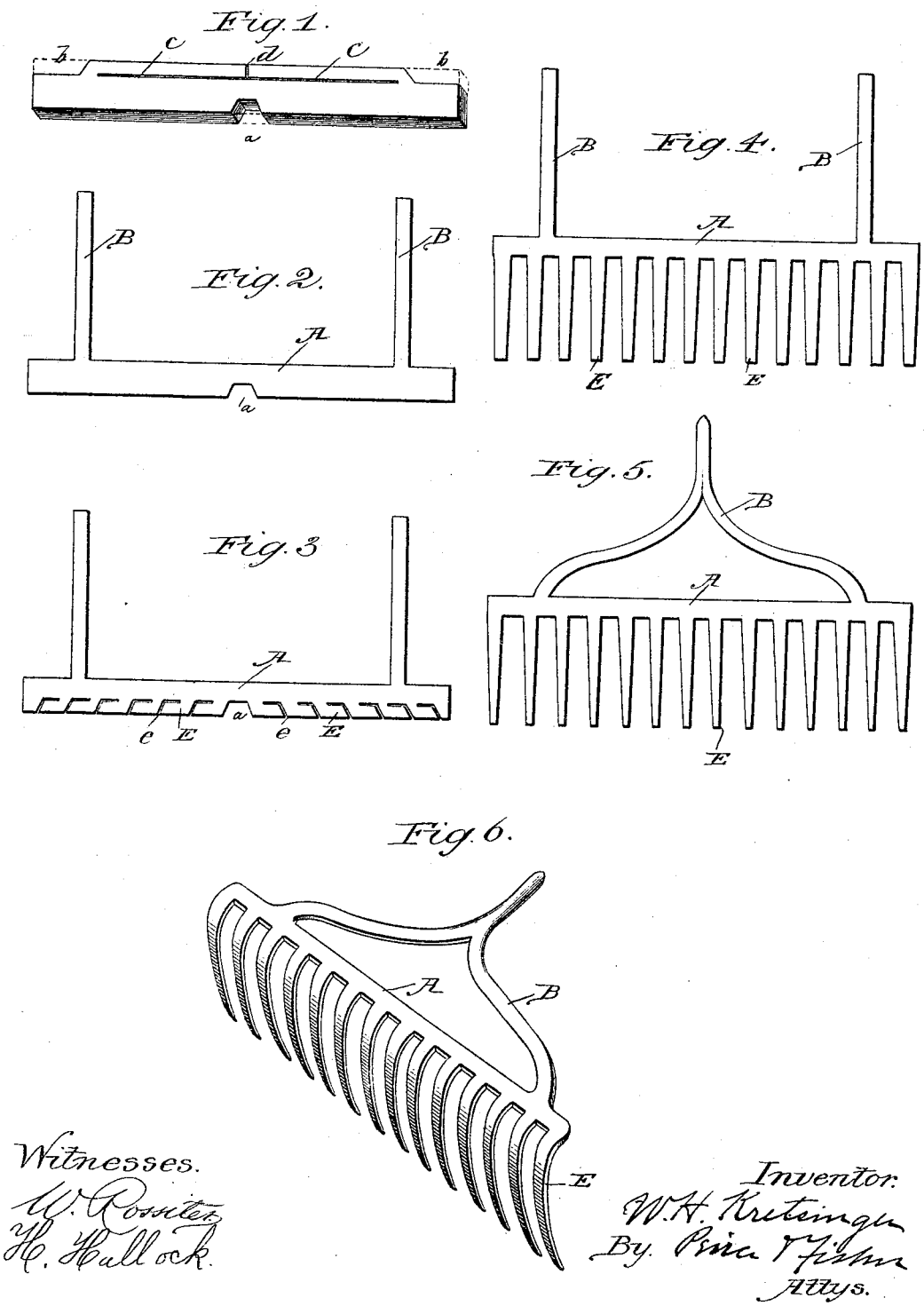

UNITED STATES PATENT OFFICE.

WILLIAM H. KRETSINGER, OF FORT MADISON, IOWA.

METHOD OF MAKING RAKES.

SPECIFICATION forming part of Letters Patent No. 328,690, dated October 20, 1885.

Application filed May 2, 1885. Serial No. 164,224. (No model.)

*To all whom it may concern:*

Be it known that I, WILLIAM H. KRETSINGER, a resident of Fort Madison, Iowa, have invented a certain new and useful Method of Manufacturing Metallic Rakes, of which I do declare the following to be a full, clear, and exact description, reference being had to the accompanying drawings, forming part of this specification.

My present invention has relation to the manufacture of that class of rakes wherein the teeth, the head, and the braces or shanks of the rake are formed from a single piece of metal without welding; and it has for its object to provide a simple and improved method of manufacture whereby a superior style of rake may be produced. This object of invention I have accomplished by the method of forming the parts now to be described.

Figure 1 is a perspective view, and Figs. 2, 3, 4, and 5 are plan views, of the blank in its several stages of manufacture. Fig. 6 is a perspective view of the finished rake.

The blank from which the rake is to be formed is a simple bar of steel or other suitable metal of practically uniform thickness throughout; and in such blank I prefer to first form the central depression, $a$, either by cutting away or compressing the blank at such point, in order to leave a proper space between the adjoining teeth at the center of the rake, as shown by Fig. 3. The ends of the blank are also preferably cut away, as shown at $b\ b$, such portions being superfluous in my method of manufacture. The longitudinal cut $c$, extending nearly from end to end of the cut-away side of the bar, and the transverse cut $d$, extending from the edge of the bar to the cut $c$, are next made, and the portions B, formed by thus cutting the blank, and which when finished constitute the shanks or braces, will be bent outward in the plane of the blank and at about right angles thereto, as shown in Fig. 2. The body of the blank is next "trued up," and the angular cuts $e$, in suitable number, are made through the bar to form the portions E, which when properly drawn and finished will constitute the teeth of the rake. These portions E will next be drawn out, as shown in Fig. 4, either by machinery or by hand, and will be hammered, trued up, and finished, as well understood in the art. The braces or shanks B will also be properly drawn and finished, and will be bent toward each other and preferably welded together, as seen in Fig. 5.

The head, teeth, and braces or shanks of the rake extend all in the same plane, and, by grinding, tempering, or like treatment in well-known manner, are brought to the finished condition in readiness for the final downward curving of the teeth and (if desired) a slight upward curving of the braces.

By the final curving of the teeth and braces there will be given to the rake the general configuration shown in Fig. 6, which will not only be more graceful and attractive in appearance than other rakes of this class with which I am familiar, but will also allow a more easy action of the rake when in use.

I am aware that rakes have been heretofore formed from a single bar of metal with integral head, braces, and teeth by cutting the teeth from one side of the bar and drawing outward the ends of the bar and bending them backward to form the braces. I am also aware that it has been heretofore proposed to form a rake from a metal bar by cutting teeth upon one side and by making two cuts from the ends toward the center near the opposite side and bending the cut portions in a plane at right angles to the plane of the head and teeth to form the shanks or braces. I am further aware that rakes have been made from a single metal bar by forming the bar with a vertically-compressed broad and thin central portion, in which a longitudinal and a transverse cut was made to form the braces, and by drawing the teeth from the opposite portion of the bar. To such methods of manufacture, therefore, I do not wish to be understood as laying claim, as from them my present invention essentially differs. By cutting, drawing, and finishing the teeth, head, and braces in the same plane, not only is greater ease of manipulation secured in hammering, grinding, and tempering the various parts, but a more desirable finish can be given to the rake than I believe to be possible with other methods of manufacture.

Having thus described my invention, what I claim as new, and desire to secure by Letters Patent, is—

1. The improvement in the method of manufacturing rakes, which consists in first cutting, bending, and drawing or forming the braces and teeth in substantially the plane of the blank and afterward shaping the braces and teeth into the proper finished form, substantially as described.

2. The improvement in the method of manufacturing rakes, which consists in cutting a blank of practically uniform thickness upon the lines $c$ and $d$ and bending the portions outward in plane of the blank to form the shanks, cutting the blank upon the lines $e$ and bending the cut portions E outward in plane of the blank to form the teeth, drawing and shaping the teeth and shanks or braces while in the plane of the blank, and, finally, bending the braces and teeth into proper finished form, substantially as described.

WILLIAM H. KRETSINGER.

Witnesses:
A. A. POTTER,
F. S. KRETSINGER.